United States Patent
Vo et al.

(10) Patent No.: US 11,020,767 B2
(45) Date of Patent: Jun. 1, 2021

(54) OPERATOR INTERFACE DEVICE FOR A PLURAL COMPONENT DISPENSING SYSTEM

(71) Applicant: Graco Minnesota Inc., Minneapolis, MN (US)

(72) Inventors: Thomas V. Vo, Akron, OH (US); Jeffrey S. Armstrong, Albuquerque, NM (US); David Bordwell, Canton, OH (US); Jonathan R. McMichael, Canton, OH (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 15/469,018

(22) Filed: Mar. 24, 2017

(65) Prior Publication Data
US 2017/0274413 A1 Sep. 28, 2017

Related U.S. Application Data

(60) Provisional application No. 62/313,929, filed on Mar. 28, 2016.

(51) Int. Cl.
*B05C 11/10* (2006.01)
*B29B 7/72* (2006.01)
*G05D 11/13* (2006.01)
*B05C 5/02* (2006.01)
*G08B 21/18* (2006.01)
(Continued)

(52) U.S. Cl.
CPC ............ *B05C 11/1036* (2013.01); *B05C 5/02* (2013.01); *B29B 7/72* (2013.01); *G05D 11/132* (2013.01); *G08B 21/18* (2013.01); *B05C 11/1013* (2013.01); *B29B 7/7447* (2013.01); *G08B 6/00* (2013.01)

(58) Field of Classification Search
CPC ... B05C 11/1036; B05C 5/02; B05C 11/1013; G05D 11/132
USPC ........................................................ 340/606
See application file for complete search history.

(56) References Cited

U.S. PATENT DOCUMENTS

| 3,894,658 A | * | 7/1975 | Buell, Jr. | ............... | B67D 7/228 |
| | | | | | 222/26 |
| 4,522,789 A | * | 6/1985 | Kelly | ..................... | B01F 5/102 |
| | | | | | 134/34 |
| 4,668,948 A | | 5/1987 | Merkel | | |

(Continued)

*Primary Examiner* — Kam Wan Ma
(74) *Attorney, Agent, or Firm* — Kinney & Lange, P.A.

(57) ABSTRACT

A plural component dispensing system includes a dispensing device, first and second fluid component sources, a system controller, and an operator interface device. The first fluid component source is connected to the dispensing device to deliver the first fluid component to the dispensing device. The second fluid component source is connected to the dispensing device to deliver the second fluid component to the dispensing device. The system controller is connected to regulate operation of the first fluid component source and the second fluid component source to produce a target ratio of the first fluid component and the second fluid component at the dispensing device. The operator interface device is remote from and operatively connected to the system controller. The operator interface device is configured to output system state information received from the system controller and to receive operator input to control an operational state of the system controller.

20 Claims, 2 Drawing Sheets

(51) Int. Cl.
*G08B 6/00* (2006.01)
*B29B 7/74* (2006.01)

(56) References Cited

U.S. PATENT DOCUMENTS

| | | | | |
|---|---|---|---|---|
| 5,257,720 | A * | 11/1993 | Wulc | B67D 7/744 |
| | | | | 222/135 |
| 5,271,521 | A * | 12/1993 | Noss | B01F 15/00025 |
| | | | | 222/1 |
| 5,381,962 | A | 1/1995 | Teague | |
| 5,481,260 | A | 1/1996 | Buckler et al. | |
| 5,660,334 | A | 8/1997 | Trusty et al. | |
| 5,671,889 | A | 9/1997 | Petty | |
| 6,500,262 | B1 | 12/2002 | Bednarz et al. | |
| 7,069,944 | B2 * | 7/2006 | Morikawa | G05D 7/0635 |
| | | | | 137/486 |
| 7,289,878 | B1 | 10/2007 | Estelle et al. | |
| 8,074,668 | B2 | 12/2011 | Alexander et al. | |
| 2006/0206238 | A1 * | 9/2006 | Walker | D06F 39/02 |
| | | | | 700/283 |
| 2007/0151984 | A1 * | 7/2007 | Baker | A61J 1/2089 |
| | | | | 222/129 |
| 2011/0280744 | A1 * | 11/2011 | Ortiz | F04B 49/065 |
| | | | | 417/313 |
| 2012/0024080 | A1 * | 2/2012 | Carbone, II | G01F 3/10 |
| | | | | 73/861.04 |
| 2012/0242601 | A1 * | 9/2012 | Agerholm | G06F 3/1423 |
| | | | | 345/173 |
| 2012/0306632 | A1 * | 12/2012 | Fleizach | G06F 3/016 |
| | | | | 340/407.2 |
| 2012/0324995 | A1 * | 12/2012 | Tincher | G01F 23/243 |
| | | | | 73/304 C |
| 2013/0092704 | A1 * | 4/2013 | Tincher | D06F 39/02 |
| | | | | 222/1 |
| 2014/0074285 | A1 * | 3/2014 | Wegelin | G06F 17/00 |
| | | | | 700/244 |
| 2014/0089073 | A1 * | 3/2014 | Jacobs | G06Q 20/20 |
| | | | | 705/14.27 |
| 2014/0259510 | A1 * | 9/2014 | Conrad | A47L 13/225 |
| | | | | 15/319 |
| 2014/0365001 | A1 * | 12/2014 | Tomkins | G07F 17/0064 |
| | | | | 700/238 |
| 2015/0028051 | A1 * | 1/2015 | Topf | B05C 11/1013 |
| | | | | 222/1 |
| 2016/0361734 | A1 * | 12/2016 | Routen | B05C 11/1013 |

* cited by examiner

OPERATOR INTERFACE DEVICE FOR A PLURAL COMPONENT DISPENSING SYSTEM

CROSS-REFERENCE TO RELATED APPLICATION(S)

This application claims priority to U.S. Provisional Application No. 62/313,929, filed on Mar. 28, 2016, and entitled "INTERACTIVE DISPENSING GUN," the disclosure of which is hereby incorporated by reference in its entirety.

BACKGROUND

This disclosure relates generally to plural component dispensing systems, and more particularly to operator interface devices for the plural component dispensing systems.

Multiple component applicators often receive separate inert fluid components that are mixed and dispensed as an activated compound. For example, multiple component applicators are used to dispense epoxies and polyurethanes that solidify after mixing of a resin component and an activating material, which are individually inert. To achieve the desired properties of the resultant material, the component materials are mixed at a predetermined ratio. A system controller device is often connected to control operation of the system to produce the predetermined ratio at a dispensing device and to provide operator feedback information corresponding to an operational state of the system. For instance, the system controller can issue an alert at a display device and/or speaker device of the controller in response to determining that a monitored ratio of the individual components delivered to the dispensing device deviates from the predetermined ratio. In addition, the system controller often provides an interface to control operation of the system via received operator input via buttons, switches, or other input devices of the controller.

An operator of the dispensing device, however, may be physically remote from the controller device while applying the activated compound. For instance, an operator can be tens or hundreds of feet from the controller device while operating the dispensing device, possibly in a noisy environment, and out of direct line-of-sight of the controller. In such examples, the operator may be unable to see (or hear) alerts generated by the system controller. Moreover, in such examples, the operator must redirect his or her attention from the dispensing point and often must physically move from the dispensing point to check the system's status and provide input to the controller to acknowledge the alert and/or change the operational state of the controller.

SUMMARY

In one example, a plural component dispensing system includes a dispensing device configured to receive a first fluid component and a second fluid component, a first fluid component source, a second fluid component source, a system controller, and an operator interface device. The first fluid component source is connected to the dispensing device to deliver the first fluid component to the dispensing device. The second fluid component source is connected to the dispensing device to deliver the second fluid component to the dispensing device. The system controller is connected to regulate operation of the first fluid component source and the second fluid component source to produce a target ratio of the first fluid component and the second fluid component at the dispensing device. The operator interface device is remote from and operatively connected to the system controller. The operator interface device is configured to output system state information received from the system controller and to receive operator input to control an operational state of the system controller.

In another example, an operator interface device for a plural component dispensing system includes at least one input device, at least one output device, one or more processors, and computer-readable memory. The computer-readable memory is encoded with instructions that, when executed by the one or more processors, cause the operator interface device to: output, via the at least one output device, system state information received from a system controller of the plural component dispensing system that is remote from the operator interface device; receive, via the at least one input device, operator input to control an operational state of the system controller; and transmit the operator input to the system controller.

DETAILED DESCRIPTION

As described herein, an operator interface device of a plural component dispensing system is remote from and operatively connected to a system controller that controls operation of the plural component dispensing system. The operator interface device outputs system state information received from the system controller, such as alert notifications, system state information corresponding to a ratio of fluid components delivered to a dispensing device, or other system state information. The operator interface device is configured to receive operator input to control an operational state of the system controller, such as via touch input (e.g., button actuation, switch actuation, or other touch input), motion input (e.g., via sensed motion of the operator interface device corresponding to a defined motion gesture), orientation input (e.g., via sensed physical orientation of the operator interface device), or other operator input to acknowledge alerts or otherwise control an operational state of the system controller. The operator interface device can be integral to or attached to a dispensing device that delivers an activated compound formed from the multiple fluid components. In some examples, the operator interface device can be wearable by the operator, such as via a lanyard around the operator's neck, wearable around the operator's wrist, or otherwise wearable by the operator. Accordingly, a system implementing techniques of this disclosure provides output to an operator of the dispensing device and enables operator input at a dispensing location that may be remote from the system controller. As such, techniques of this disclosure help to increase operator awareness of the system operational state and enable operator feedback at locations that may be remote from the system controller.

Figure 1:
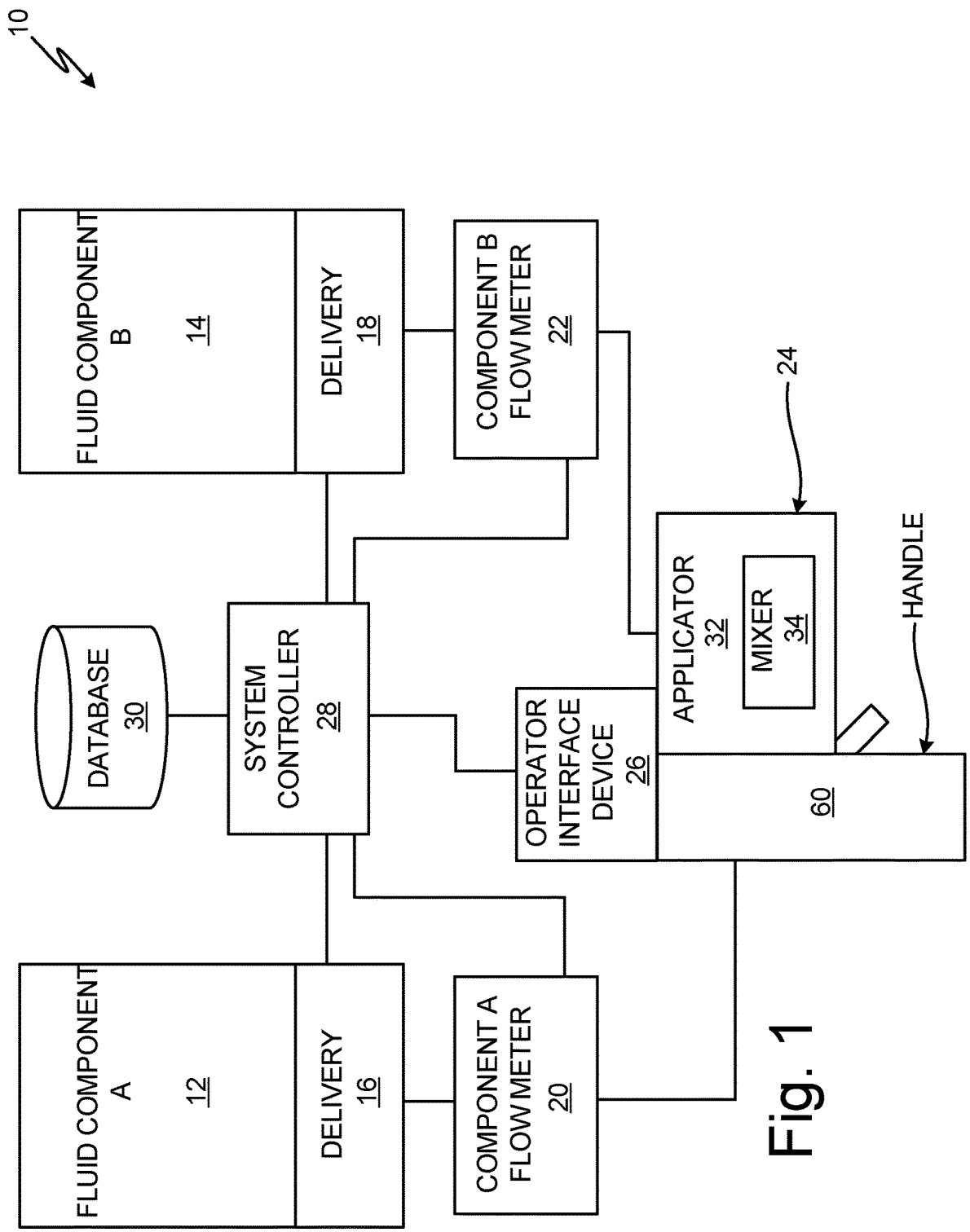
FIG. 1 is a schematic block diagram of a two component fluid dispensing system including an operator interface device that is remote from and operatively connected to a system controller.

FIG. 1 is a schematic block diagram of fluid dispensing system 10. As illustrated in FIG. 1, fluid dispensing system 10 includes fluid component A source 12, fluid component B source 14, fluid component A delivery system 16, fluid component B delivery system 18, fluid component A flow meter 20, fluid component B flow meter 22, dispensing device 24, operator interface device 26, system controller 28, and database 30. Dispensing device 24 includes applicator 32 and mixer 34.

Fluid component A source 12 and fluid component B source 14 each store individually-inert fluid components that, when mixed at dispensing device 24 (e.g., at mixer 34), chemically react to form an activated material, such as a quick-cure polyurethane foam, an epoxy, or other activated material that is delivered from dispensing device 24. For instance, fluid component A stored at fluid component A source 12 can be a catalyst fluid component and fluid component B stored at fluid component B source 14 can be a base material that, when mixed, chemically react to form the activated material.

Each of fluid component A delivery system 16 and fluid component B delivery system 18 can be pumps (e.g., positive displacement pumps), compressed gas delivery systems, or other delivery systems configured to cause fluid component A source 12 to discharge fluid component A (i.e., via fluid component A delivery system 16) and fluid component B source 14 to discharge fluid component B (i.e., via fluid component B delivery system 18).

As illustrated in FIG. 1, each of fluid component A source 12 and fluid component B source 14 are hydraulically connected to dispensing device 24. Fluid component A flow meter 20 is located between fluid component A source 12 and dispensing device 24 to measure a volumetric flow rate of fluid component A discharged from fluid component A source 12 to dispensing device 24. Fluid component B flow meter 22 is located between fluid component B source 14 and dispensing device 24 to measure a volumetric flow rate of fluid component B discharged from fluid component B source 18 to dispensing device 24. Each of fluid component A flow meter 20 and fluid component B flow meter 22 can be a positive displacement meter (e.g., gear meter), mass flow meter, or other type of flow meter. Fluid component A flow meter 20 and fluid component B flow meter 22 can be a same or different type of flow meter. In general, each of fluid component A flow meter 20 and fluid component B flow meter 22 can be any type of flow meter configured to measure a volumetric flow rate of fluid component passing through the respective flow meter and transmit an indication of the sensed volumetric flow rate to system controller 28.

Dispensing device 24, as illustrated in FIG. 1, includes applicator 32 and mixer 34. Dispensing device 24 can be, e.g., a dispensing gun configured to receive the individually-inert fluid component A and fluid component B and deliver an activated component after mixing of the two components at mixer 34. That is, applicator 32 receives each of fluid component A and fluid component B and provides the two individual components to mixer 34, which mixes the two components during delivery. Accordingly, mixing of fluid component A and fluid component B is delayed until delivery of the components through mixer 34 and release of the activated material from dispensing device 24.

System controller 28 includes one or more processors and computer-readable memory encoded with instructions that, when executed by the one or more processors, cause system controller 28 to operate in accordance with techniques described herein. Examples of the one or more processors include any one or more of a microprocessor, a digital signal processor (DSP), an application specific integrated circuit (ASIC), a field-programmable gate array (FPGA), or other equivalent discrete or integrated logic circuitry. Computer-readable memory of system controller 28 can be configured to store information within system controller 28 during operation. The computer-readable memory can be described, in some examples, as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). Computer-readable memory of system controller 28 can include volatile and non-volatile memories. Examples of volatile memories can include random access memories (RAM), dynamic random access memories (DRAM), static random access memories (SRAM), and other forms of volatile memories. Examples of non-volatile memories can include magnetic hard discs, optical discs, floppy discs, flash memories, or forms of electrically programmable memories (EPROM) or electrically erasable and programmable (EEPROM) memories.

System controller 28, in some examples, includes user interface components including one or more input devices (e.g., a keyboard, buttons, mouse, microphone, or other input devices) configured to receive input from a user and one or more output devices (e.g., a display device, indicator lights, or other output devices) configured to present information to a user. In some examples, system controller 28 includes a touch-sensitive display configured to receive user input in the form of gestures (e.g., touch gestures, swipe gestures, pinch gestures, or other gestures) and to display information to the user.

As illustrated in FIG. 1, system controller 28 is communicatively coupled with database 30. Database 30 can be a hierarchical database, a relational database, a multi-dimensional database, or other type of database. System controller 28 utilizes database 30 to store system state information in association with product identification information and/or operator identification information, as is further described below. Though illustrated as including a single database, in other examples, database 30 can be implemented as multiple databases or other data retrieval and/or archival data structures. In addition, though the example of FIG. 1 illustrates database 30 as remote from and communicatively coupled with system controller 28, in other examples, system controller 28 can store and/or implement database 30, such as at computer-readable memory of system controller 28.

System controller 28 is electrically and/or communicatively coupled with each of fluid component A flow meter 20 and fluid component B flow meter 22 to receive volumetric flow rates sensed by each of fluid component A flow meter 20 and fluid component B flow meter 22. System controller 28 is further connected (e.g., electrically and/or communicatively connected) to each of fluid component A delivery system 16 and fluid component B delivery system 18 to control operation of fluid component A delivery system 16 and fluid component B delivery system 18 to produce a target ratio of fluid component A and fluid component B delivered to dispensing device 24. For example, system controller 28 can transmit control commands in the form of voltage control commands, electrical current control commands, or other control commands to cause fluid component A delivery system 16 and fluid component B delivery system 18 to regulate the respective fluid flow discharge rates of fluid component A and fluid component B to produce a target ratio (i.e., a target mix ratio) of fluid component A and fluid component B delivered to dispensing device 24. System controller 28 can store the target ratio and/or receive the target ratio via a user interface of system controller 28 (e.g., via user input).

System controller 28 determines a ratio of fluid component A to fluid component B delivered to dispensing device

24 as the ratio of the volumetric flow rate sensed by fluid component A flow meter 20 to the volumetric flow rate sensed by fluid component B flow meter 22. Based on the determined ratio of the volumetric flow rates, system controller 28 controls operation of fluid component A delivery system 16 and fluid component B delivery system 18 to regulate the respective fluid discharge rates to produce the target mix ratio. For example, system controller 28 can implement a proportional-integral-derivative or other control algorithm to cause fluid component A delivery system 16 to increase a discharge rate of fluid component A and/or to cause fluid component B delivery system 18 to decrease a discharge rate of fluid component B in response to determining that the ratio of the sensed volumetric flow rate received from fluid component A flow meter 20 to the sensed volumetric flow rate received from fluid component B flow meter 22 is less than the target ratio of fluid component A to fluid component B. System controller 28 can cause fluid component A delivery system 16 to decrease a discharge rate of fluid component A and/or cause fluid component B delivery system 18 to increase a discharge rate of fluid component B in response to determining that the ratio of the sensed volumetric flow rate received from fluid component A flow meter 20 to the sensed volumetric flow rate received from fluid component B flow meter 22 is greater than the target ratio of fluid component A to fluid component B. As such, system controller 28 can automatically control operation of fluid component A delivery system 16 and/or fluid component B delivery system 18 to produce the target mix ratio of fluid component A and fluid component B delivered to dispensing device 24.

As illustrated in FIG. 1, system controller 28 is operatively connected (e.g., electrically and/or communicatively connected) to operator interface device 26. The operative connection can be a wired connection, a wireless connection, or both. Operator interface device 26 is configured to output system state information received from system controller 28 corresponding to an operational state of fluid component dispensing system 10. In addition, operator interface device 26 is configured to receive operator input to control an operational state of system controller 28, as is further described below.

Examples of system state information received by operator interface device 26 from system controller 28 include, but are not limited to, an indication of whether a ratio of fluid component A and fluid component B delivered to dispensing device 24 (e.g., determined by system controller 28 via sensed volumetric flow rates received from fluid component A flow meter 20 and fluid component B flow meter 22) deviates from the target ratio of fluid component A and fluid component B, an indication of an operational mode of system controller 28, and an indication of an alert condition of fluid dispensing system 10. Indications of the operational mode of system controller 28 can include, e.g., an indication of a fluid dispensing operational mode in which both fluid component A and fluid component B are delivered to dispensing device 24, an indication of a purge mode in which only one of fluid component A and fluid component B is delivered to dispensing device 24, an indication of a standby mode in which system controller 28 refrains from causing either of fluid component A or fluid component B to be discharged, or other operational modes. Indications of the alert condition can include, for example, an indication that the ratio of fluid component A and fluid component B delivered to dispensing device 24 deviates from the target ratio, an indication that a remaining volume of fluid component A within fluid component A source 12 and/or a remaining volume of fluid component B within fluid component B source 14 is less than a threshold volume, or other indications of alert conditions.

Examples of operator input received by operator interface device 26 and transmitted to system controller 28 to control an operational state of system controller 28 can include, e.g., touch input received via actuation of buttons, switches, or other touch input devices of operator interface device 26, motion input sensed by one or motion sensors of operator interface device 26 (e.g., accelerometers, rate gyroscopes, or other motion sensors), orientation input sensed by one or more orientation sensors of operator interface device 26 (e.g., accelerometers or other orientation sensors), voice or other audible input sensed by a microphone of operator interface device 26, product identification data retrieved by an optical scanner and/or RFID reader of operator interface device 26, or other types of operator input.

Operator interface device 26 can be attached to or integrally formed with dispensing device 24. For instance, in some examples, operator interface device 26 is integrally formed within an interior of dispensing device 24, such as within a handle 60 or other housing of dispensing device 24. In other examples, operator interface device 26 is configured to be attached to an exterior of dispensing device 24, such as via bolt, screw, clip, or other fastening devices. In yet other examples, operator interface device 26 is configured to be wearable by the operator. For instance, operator interface device 26 can be configured to be worn around the operator's neck via a lanyard, around the operator's wrist (e.g., as a watch), or otherwise worn by the operator. In general, operator interface device 26 is configured to be attached to, integrally formed with, or otherwise collocated with dispensing device 24 during operation of dispensing device 24 to deliver the activated material at, e.g., a worksite.

Hydraulic connections between dispensing device 24 and fluid component A source 12 and fluid component B source 14 enable operation of dispensing device 24 at a dispensing location that can be, e.g., tens of feet, hundreds of feet, or other distances from system controller 28 to deliver the activated material. Operator interface device 26, configured to be collocated with dispensing device 24 during operation, enables the operator to receive feedback regarding an operating state of the system as well as to provide input to control an operational state of the controller from the dispensing location without requiring the operator to physically move to the controller to check the system status or provide operating inputs. As such, a system implementing techniques of this disclosure enhances operator awareness and increases efficiency of operator inputs to control the fluid dispensing system.

Figure 2:
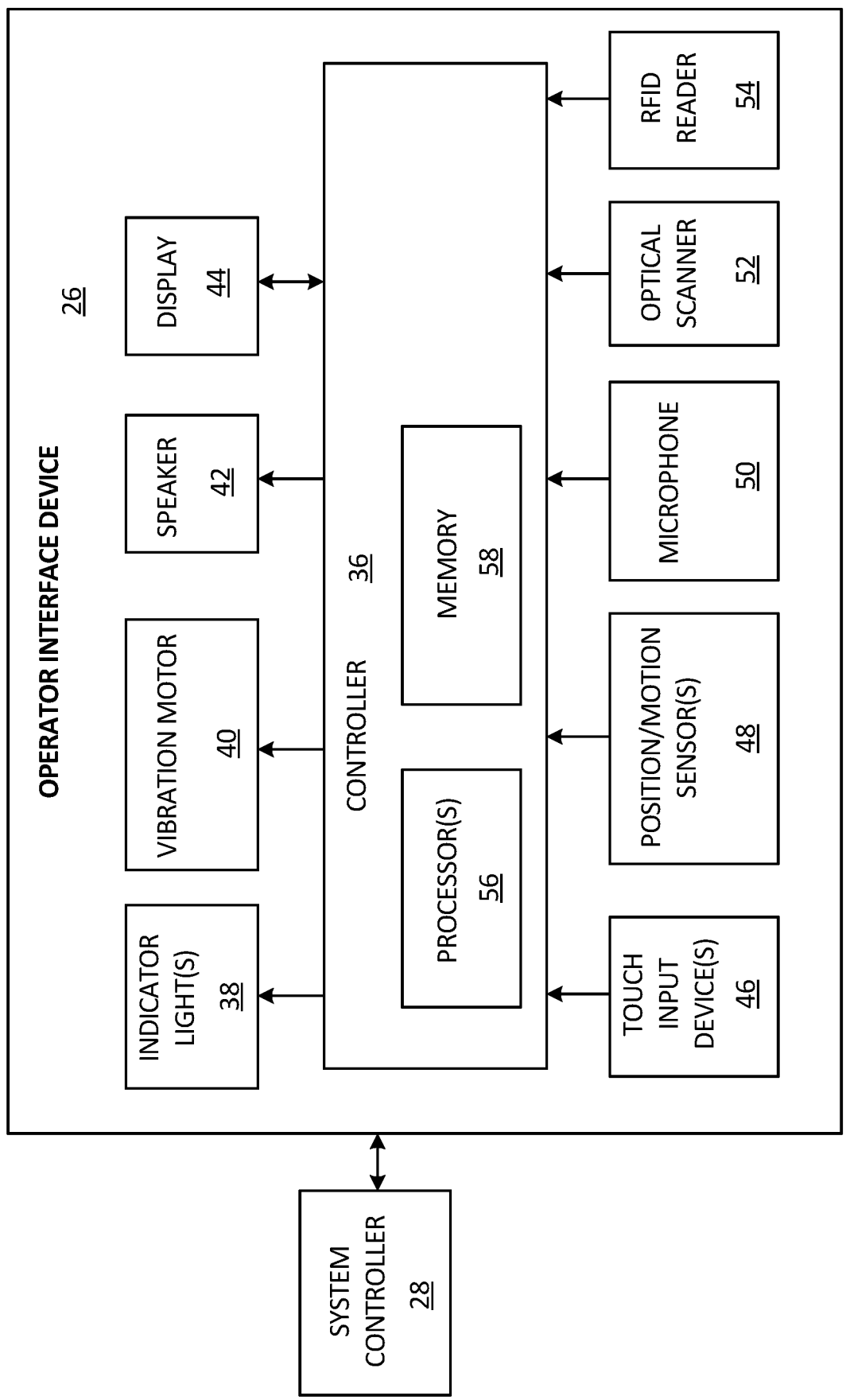
FIG. 2 is a schematic block diagram showing further details of the operator interface device of FIG. 1.

FIG. 2 is a schematic block diagram showing further details of operator interface device 26. For purposes of ease of discussion, the example of FIG. 2 will be described below within the context of fluid dispensing system 10 of FIG. 1.

As illustrated in FIG. 2, operator interface device 26 includes controller 36, one or more indicator lights 38, vibration motor 40, speaker device 42, display device 44, one or more touch input devices 46, one or more position and motion sensors 48, microphone 50, optical scanner 52, and radio-frequency identification (RFID) reader 54. Controller 36 includes one or more processors 56 and computer-readable memory 58.

As illustrated in FIG. 2, operator interface device 26 is operatively coupled with system controller 28 via one or more wired or wireless communication networks, or both. Controller 36 receives system state information from system controller 28 via the wired and/or wireless connection and outputs an indication of the system state information via any one or more of indicator lights 38, vibration motor 40, speaker device 42, and display device 44. Controller 36 receives operator input via any one or more of display device 44 (e.g., a touch-sensitive and/or presence-sensitive display device), touch input devices 46, position and motion sensors 48, microphone 50, optical scanner 52, and RFID reader 54. Controller 36 transmits an indication of the received operator input to system controller 28 via the wired and/or wireless connection to control an operational state of system controller 28, as is further described below.

Processors 56 and computer-readable memory 58 of controller 36 can be substantially similar to processors and computer-readable memory of system controller 28. That is, processors 56 can include any one or more of a microprocessor, a digital signal processor (DSP), an application specific integrated circuit (ASIC), a field-programmable gate array (FPGA), or other equivalent discrete or integrated logic circuitry. Computer-readable memory 58 can include volatile and/or non-volatile memory encoded with instructions that, when executed by processors 56, cause controller 36 to operate in accordance with techniques described herein.

Indicator lights 38 can include any one or more light emitting diodes (LEDs), indicator lamps, or other types of indicator lights. Controller 36, in some examples, controls an illumination state of one or more of indicator lights 38 to indicate system state information received from system controller 28. For instance, in examples where system state information received from system controller 28 includes an indication of whether a ratio of fluid component A and fluid component B delivered to dispensing device 24 deviates from the target ratio, controller 36 can control an illumination state of indicator lights 38 to indicate whether the ratio of fluid component A and fluid component B deviates from the target ratio. For example, controller 36 can illuminate one or more of indicator lights 38 in response to receiving system state information from system controller 28 indicating that the ratio of fluid component A and fluid component B delivered to dispensing device 24 does not deviate from the target ratio. Controller 36 can cause the one or more indicator lights 38 to operate in a non-illuminated state in response to receiving the system state information indicating that the ratio of fluid component A and fluid component B delivered to dispensing device 24 deviates from the target ratio. In other examples, controller 36 can cause the one or more of indicator lights 38 to operate in the non-illuminated state in response to receiving system state information from system controller 28 indicating that the ratio of fluid component A and fluid component B delivered to dispensing device 24 does not deviate from the target ratio, and can cause the one or more of indicator lights 38 to operate in the illuminated state in response to receiving the system state information indicating that the ratio of fluid component A and fluid component B delivered to dispensing device 24 deviates from the target ratio.

In some examples, controller 36 can cause a first one of indicator lights 38 (e.g., a green indicator light) to illuminate in response to receiving the system state information indicating that the ratio of fluid component A and fluid component B delivered to dispensing device 24 does not deviate from the target ratio, and can cause a second one of indicator lights 38 (e.g., a red indicator light) to illuminate in response to receiving the system state information indicating that the ratio of fluid component A and fluid component B delivered to dispensing device 24 deviates from the target ratio. In general, controller 36 can control an illumination state of any one or more of indicator lights 38 to indicate system state information received from system controller 28, such as to indicate whether a ratio of fluid component A and fluid component B delivered to dispensing device 24 deviates from a target ratio.

Vibration motor 40 can be an electric motor or other type of motor that, when actuated, causes vibration motor 40 to vibrate to provide haptic vibration feedback that can be felt by an operator in contact with operator interface device 26. For instance, vibration motor 40 can be an electric motor having an unbalanced mass on a driveshaft that, when actuated, causes vibration motor 40 (and hence operator interface device 26) to vibrate. Controller 36, in some examples, actuates vibration motor 40 to provide haptic vibration feedback indicating system state information received from system controller 28. For instance, controller 36 can actuate vibration motor 40 to provide the haptic vibration feedback in response to receiving system state information indicating an alert condition, such as an alert condition corresponding to a ratio of fluid component A and fluid component B delivered to dispensing device 24 that deviates from the target ratio, an alert condition corresponding to a volume of fluid component A within fluid component A source 12 and/or a volume of fluid component B within fluid component B source 14 that is less than a threshold volume, or other type of alert condition. In some examples, controller 36 can actuate vibration motor 40 to provide haptic vibration feedback configured to identify the alert condition, such as a first defined pattern of vibration (e.g., one vibration) indicating a first alert condition, a second defined pattern of vibration (e.g., two or more vibrations in sequence) indicating a second alert condition, or other patterns of vibrations. In general, controller 36 can actuate vibration motor 40 to provide haptic vibration feedback to an operator to notify the operator of an alert condition, a change in a system operational state, and/or to identify an alert condition or other operational state of system controller 28.

Controller 36 utilizes speaker 42 to output audible tones indicating system state information received from system controller 28. For instance, controller 36 can cause speaker 42 to output a single tone, a multi-tone output, a sequence of tones, a buzzer, voice outputs, or other audible indications of system state information and/or alert conditions.

Display device 44 can be a liquid crystal display (LCD), alphanumeric display, or other type of display configured to present content to an operator. In some examples, display device 44 can include a touch-sensitive and/or presence-sensitive interface to enable operator input in the form of touch gestures (e.g., tap gestures, swipe gestures, pinch gestures, or other gestures). Controller 36, in some examples, presents system state information received from system controller 28 at display device 44. For instance, controller 36 can cause display device 44 to display a current operational state (e.g., mode of operation), an indication of an alert condition, an indication of a type of alert, a current ratio of fluid component A and fluid component B delivered to dispensing device 24, the target ratio of fluid component A and fluid component B, or other system state information. In certain examples, such as when display device 44 includes a touch-sensitive and/or presence-sensitive interface, controller 36 can receive operator input to, e.g., acknowledge an alert condition and/or change an operation state of system controller 28 via gesture input received at display device 44.

As illustrated in FIG. 2, controller 36 receives input from any one or more of touch input devices 46, position and motion sensors 48, microphone 50, optical scanner 52, and RFID reader 54. Touch input devices 46 can include buttons, switches, or other types of touch-activated input devices to enable operator input to acknowledge an alert condition or otherwise control an operational state of system controller 36. For instance, touch input devices 46 can enable operator input to change system operating modes, such as from a dispensing mode in which fluid component A and fluid component B are delivered to dispensing device 24 to a standby mode in which fluid component A and fluid component B are not delivered to dispensing device 24. Touch input devices 46, in some examples, can enable operator input to change system parameters, such as a flow rate of one or more of fluid component A and fluid component B delivered to dispensing device 24.

Position and motion sensors 48 can include, e.g., any one or more accelerometers and/or rate gyroscopes configured to sense relative motion and/or orientation of operator interface device 26. Controller 36 can, in certain examples, compare relative motion sensed by the accelerometers and/or rate gyroscopes to motion corresponding to a predetermined motion gesture (e.g., a shaking motion gesture, an impact motion gesture, or other motion gesture) to determine whether the sensed motion corresponds to operator input to control an operational state of system controller 28. For example, controller 36 can compare motion sensed by position and motion sensors 48 to a predetermined motion gesture corresponding to a shaking motion gesture (e.g., shaking of operator interface device 26), and can determine that the shaking motion corresponds to operator input to acknowledge an alert, such as an alert corresponding to a ratio of fluid component A and fluid component B delivered to dispensing device 24 that deviates from the target ratio. In response, controller 36 can transmit an indication of the motion gesture to acknowledge the alert condition to system controller 28, which controls an operational state based on the received acknowledgement (e.g., by clearing the alert condition, continuing to operate with the alert condition, resuming a fluid dispensing operational mode in response to receiving the acknowledgement, or otherwise controlling the operational state based on the received acknowledgement).

In some examples, controller 36 can compare the relative motion sensed by the accelerometers and/or rate gyroscopes to predefined motion gestures to change the operational state of system controller 28. For instance, a first predefined motion gesture can correspond to operator input to initiate a fluid dispensing operational mode of system controller 28 in which system controller 28 causes delivery of fluid component A and fluid component B to dispensing device 24. A second predefined motion gesture can correspond to operator input to initiate a standby operational mode of system controller 28 in which system controller 28 ceases to cause delivery of fluid component A and fluid component B to dispensing device 24. As such, sensed motion of operator interface device 26 corresponding to predefined motion gestures can enable control of an operational mode of system controller 28 via the predefined motion gestures. In general, controller 36 can compare motion sensed by the accelerometers and/or rate gyroscopes to motion corresponding to any one or more predetermined motion gestures associated with defined operator input to acknowledge an alert condition or otherwise control an operational state of system controller 28.

In some examples, position and motion sensors 48 can include one or more orientation sensors, such as a plurality of accelerometers (e.g., three accelerometers), each aligned along one of a plurality of mutually-orthogonal axes. Controller 36 can determine an orientation of operator interface device 26 based on orientation sensed via the plurality of accelerometers. Controller 36 can determine whether the sensed orientation corresponds to operator input to control an operational state of system controller 28. For instance, controller 36 can determine whether the sensed orientation corresponds to an orientation of, e.g., a nozzle of dispensing device 24 that is within a threshold angle (e.g., within ten degrees) from a vertical orientation with the nozzle pointed toward the ground. Such vertical orientation with the nozzle pointed toward the ground can correspond to operator input of placing the nozzle of dispensing device 24 within a bucket or other container to initiate, e.g., a purge mode of operation in which only one of fluid component A and fluid component B is delivered to dispensing device 24 to purge dispensing device 24 of the other fluid component. For instance, in examples where fluid component A is a catalyst component and fluid component B is a base component, the purge mode can initiate delivery of only fluid component B (i.e., the base component in this example) to dispensing device 24 to purge dispensing device 24 of residual fluid component A (i.e., catalyst component in this example). Controller 36, in response to identifying that the orientation of operator interface device 26 corresponds to the operator input orientation to initiate (or enable) the base purge mode, can transmit an indication of the orientation to system controller 28. System controller 28, in response, can initiate (or enable) the base purge mode. In general, controller 36 can compare orientation information sensed by orientation sensors (e.g., accelerometers) of operator interface device 26 to defined operator orientation input to enable operator input to control an operational state of system controller 28 via orientation of operator interface device 26.

In some examples, position and motion sensors 48 can include a proximity sensor that senses proximity of the sensor to another object. For instance, such as when operator interface device 26 is disposed proximate a nozzle of dispensing device 24, controller 36 can transmit to system controller 28 an indication of whether the proximity sensor senses proximity to an object (e.g., a product to which activated compound is to be applied). System controller 28 can enable delivery of fluid component A and fluid component B to dispensing device 24 in response to an indication received from operator interface device 26 corresponding to sensed proximity to an object, and can disable delivery of the fluid components in response to an indication received from operator interface device 26 indicating that proximity to an object is not sensed. As such, system controller 28 can enable dispensing of the activated compound from dispensing device 24 when operator interface device 26 (and hence the nozzle in this example) is close to an object, and can disable dispensing of the activated compound when operator interface device 26 (and the nozzle) is not close to an object.

Controller 36, in some examples, receives audible operator input via microphone 50. Such audible input can include, e.g., voice input commands to acknowledge an alert condition or otherwise control an operational state of system controller 28. For instance, controller 36 can implement one or more voice recognition algorithms to compare audible inputs received via microphone 50 to speech patterns corresponding to define operator input commands. In response to determining that audible input received via microphone 50 corresponds to a defined operator input command, controller 36 can transmit an indication of the identified input command to system controller 28, which controls an operational state according to the received command.

Optical scanner 52 can include any optical input device (e.g., a camera, a laser-based scanner, or other optical input device) that captures machine-readable encoded information, such as a barcode, a matrix barcode (e.g., QR code), or other machine-readable encoded information and translates the encoded information to digital form. RFID reader 54 includes a radio-frequency antenna that sends and/or receives power, data, and/or commands to retrieve information from RFID tags remote from RFID reader 54.

Controller 36, in some examples, utilizes optical scanner 52 and/or RFID reader 54 to retrieve information corresponding to products to which activated compound is to be applied using dispensing device 24. For example, a product to which activated compound is to be applied (e.g., a window to which activated epoxy is to be applied) can include a barcode, a matrix barcode, and/or a RFID tag including product identification data uniquely identifying the product (e.g., a serial number or other unique product identification data). Controller 36 can retrieve the product identification information via optical scanner 52 and/or RFID reader 54, and can transmit the product identification information to system controller 28. System controller 28 can store the product identification information within database 30 in association with system state information of fluid dispensing system 10 during application of the activated compound to the product via dispensing device 24. Examples of system state information stored in association with the product identification information can include, e.g., a time and/or date of application of the activated compound, a ratio of fluid component A and fluid component B delivered to dispensing device 24 during application, a volume of one or more of fluid component A and fluid component B delivered to dispensing device 24 during application, an indication of whether alert conditions were triggered during the application, or other system state information. Such stored information can be later retrieved to assess the qualities of activated compound applied to a particular product, as well as the operational state of fluid dispensing system 10 during application.

In some examples, controller 36 transmits identification information retrieved from an RFID tag via RFID reader 54 to system controller 28. System controller 28 can, in certain examples, control an operational state of system controller 28 based on the received identification information corresponding to the RFID tag. For instance, system controller 28 can enable operation of dispensing device 24 to apply the activated compound by delivering fluid component A and fluid component B to dispensing device 24 in response to receiving the identification information retrieved from the RFID tag, and can disable operation of dispensing device 24 to apply the activated compound by ceasing to deliver fluid component A and fluid component B to dispensing device 24 when the identification information is not received. As such, system controller 28 can enable operation of dispensing device 24 to apply the activated compound when, for example, operator interface device 26 is near to the RFID tag including the identification information (e.g., located at a designated work area), and can disable operation of dispensing device 24 when operator interface device 26 is not near to the RFID tag.

In certain examples, an RFID tag including unique operator identification information can be worn by or otherwise collocated with the operator. In such examples, controller 36 can transmit, to system controller 28, the unique operator identification information retrieved from the RFID tag by RFID reader 54. System controller 28 can store system state information in association with the unique operator identification information at, e.g., database 30. Stored system state information can include, e.g., a ratio of fluid component A and fluid component B delivered to dispensing device 24 during application, a volume of one or more of fluid component A and fluid component B delivered to dispensing device 24 during application, an indication of whether alert conditions were triggered during the application, or other system state information. Accordingly, system controller 28 can store information corresponding to operator usage of fluid dispensing system 10 that is unique to a particular operator and which can be later retrieved for, e.g., operations planning feedback or other activities.

According to techniques of this disclosure, operator interface device 26 can provide output to an operator of dispensing device 24 and enable operator input at a dispensing location that may be remote from system controller 28. As such, techniques described herein can increase operator awareness of the operational state of fluid dispensing system 10 and enable operator input to control the operational state at locations that may be remote from system controller 28.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A plural component dispensing system comprising:
a dispensing device configured to receive a first fluid component and a second fluid component and to deliver an activated component after mixing of the first fluid component and the second fluid component, the dispensing device comprising an applicator and a mixer, the applicator configured to separately receive the first fluid component and the second fluid component and to deliver both the first fluid component and the second fluid component to the mixer for mixing;
a first fluid component source configured to store the first fluid component;
a first fluid pump connected to the dispensing device and to the first fluid component source to deliver the first fluid component to the dispensing device;
a second fluid component source configured to store the second fluid component;
a second fluid pump connected to the dispensing device and to the second fluid component source to deliver the second fluid component to the dispensing device;
a first flow meter fluidly connected to and positioned between the first fluid pump and the dispensing device, and a second flow meter fluidly connected to and positioned between the second fluid pump and the dispensing device;
a system controller connected to the first fluid pump and to the second fluid pump to regulate operation of the first fluid pump and the second fluid pump to produce a target ratio of the first fluid component and the second fluid component at the dispensing device, wherein the system controller is directly connected to the first flow meter to receive a flow rate of the first fluid component, and wherein the system controller is directly connected to the second flow meter to receive a flow rate of the second fluid component; and an operator interface device remote from and operatively connected to the system controller, the operator interface device configured to:
  output system state information received from the system controller; and
  receive operator input to control an operational state of the system controller.

2. The plural component dispensing system of claim 1, wherein the system state information received by the operator interface device from the system controller device comprises an indication of whether a ratio of the first fluid component and the second fluid component delivered to the dispensing device deviates from the target ratio.

3. The plural component dispensing system of claim 2, wherein the operator interface device comprises one or more indicator lights; and
wherein the operator interface device is configured to control an illumination state of the one or more indicator lights to indicate whether the ratio of the first fluid component and the second fluid component delivered to the dispensing device deviates from the target ratio.

4. The plural component dispensing system of claim 1, wherein the operator interface device comprises a display device; and
wherein the operator interface device is configured to output the system state information received from the system controller via the display device.

5. The plural component dispensing system of claim 4, wherein the display device comprises a touch-sensitive display; and
wherein the operator interface device is configured to receive the operator input via the touch-sensitive display.

6. The plural component dispensing system of claim 1, wherein the operator interface device comprises a speaker device; and
wherein the operator interface device is configured to output the system state information received from the system controller via the speaker device.

7. The plural component dispensing system of claim 1, wherein the operator interface device comprises a vibration motor; and
wherein the operator interface device is configured to output the system state information received from the system controller by actuating the vibration motor to provide vibratory haptic feedback corresponding to the system state information.

8. The plural component dispensing system of claim 7, wherein the system state information indicates an alert condition; and
wherein the operator interface device is configured to actuate the vibration motor to provide the vibratory haptic feedback corresponding to the alert condition in response to receiving the system state information indicating the alert condition.

9. The plural component dispensing system of claim 8, wherein the vibratory haptic feedback corresponding to the alert condition comprises a pattern of vibrations that identifies a type of alert associated with the alert condition.

10. The plural component dispensing system of claim 1, wherein the operator interface device comprises one or more motion sensors; and
wherein the operator interface device is configured to receive the operator input to control the operational state of the system controller via motion of the operator interface device sensed by the one or more motion sensors.

11. The plural component dispensing system of claim 10, wherein the motion of the operator interface device sensed by the one or more motion sensors corresponds to a defined motion gesture.

12. The plural component dispensing system of claim 1, wherein the operator interface device comprises one or more orientation sensors; and
wherein the operator interface device is configured to receive the operator input to control the operational state of the system controller via an orientation of the operator interface device sensed by the one or more orientation sensors.

13. The plural component dispensing system of claim 1, wherein the operator interface device comprises a scanner device;
wherein the operator interface device is configured to:
  retrieve, via the scanner device, product identification information from a machine-readable product identification code; and
  transmit the product identification information to the system controller; and
wherein the system controller is configured to store at least a portion of the system state information in association with the product identification information in a database.

14. The plural component dispensing system of claim 13, wherein the scanner device comprises an optical scanner; and
wherein the machine-readable product identification code comprises one or more of a machine-readable barcode and a machine-readable matrix barcode.

15. The plural component dispensing system of claim 13, wherein the scanner device comprises a radio-frequency identification (RFID) reader; and
wherein the machine-readable product identification code comprises an RFID tag.

16. The plural component dispensing system of claim 1, wherein the operator interface device is integrally formed with the dispensing device.

17. A dispensing device for a plural component dispensing system, the dispensing device comprising:
an applicator configured to separately receive each of a plurality of fluid components from a plurality of fluid pumps, wherein the dispensing device is a dispensing gun comprising a handle;
a mixer configured to:
  receive each of the plurality of fluid components;
  mix the plurality of fluid components to produce an activated component; and
  deliver the activated component; and
an operator interface device mounted on or within the dispensing gun, the operator interface device comprising:
  at least one input device;
  at least one output device;
  one or more processors; and
  computer-readable memory encoded with instructions that, when executed by the one or more processors, cause the operator interface device to:
    output, via the at least one output device, system state information received from a system controller of the plural component dispensing system that is remote from the operator interface device and connected to each of the plurality of fluid pumps to regulate operation of each of the plurality of fluid pumps to produce a target ratio of the plurality of fluid components at the dispensing device;

receive, via the at least one input device, operator input to control an operational state of the system controller; and transmit the operator input to the system controller.

18. The dispensing device of claim 17,
wherein the at least one output device of the operator interface device comprises one or more indicator lights; and
wherein the computer-readable memory is further encoded with instructions that, when executed by the one or more processors, cause the operator interface device to output the system state information received from the system controller by at least controlling an illumination state of the one or more indicator lights to output the system state information.

19. The dispensing device of claim 17,
wherein the at least one input device of the operator interface device comprises one or more motion sensors; and
wherein the computer-readable memory is further encoded with instructions that, when executed by the one or more processors, cause the operator interface device to receive the operator input to control the operational state of the system controller by at least identifying a defined motion gesture corresponding to motion of the operator interface device sensed by the one or more motion sensors.

20. A plural component dispensing system comprising:
a dispensing gun configured to receive a first fluid component and a second fluid component and to deliver an activated component after mixing of the first fluid component and the second fluid component, the dispensing gun comprising a handle, an applicator, and a mixer, the applicator configured to separately receive the first fluid component and the second fluid component and to deliver both the first fluid component and the second fluid component to the mixer for mixing;

a first fluid component source configured to store the first fluid component;

a first fluid pump connected to the dispensing gun and to the first fluid component source to deliver the first fluid component to the dispensing gun, wherein the first fluid pump is disposed remote from the dispensing gun;

a second fluid component source configured to store the second fluid component;

a second fluid pump connected to the dispensing gun and to the second fluid component source to deliver the second fluid component to the dispensing gun, the second fluid pump is disposed remote from the dispensing gun;

a system controller connected to the first fluid pump and to the second fluid pump to regulate operation of the first fluid pump and the second fluid pump to produce a target ratio of the first fluid component and the second fluid component at the dispensing gun; and an operator interface device remote from and operatively connected to the system controller, the operator interface device is integrally formed within the handle of the dispensing gun and configured to:
output system state information received from the system controller; and
receive operator input to control an operational state of the system controller.

\* \* \* \* \*